Patented Nov. 7, 1933

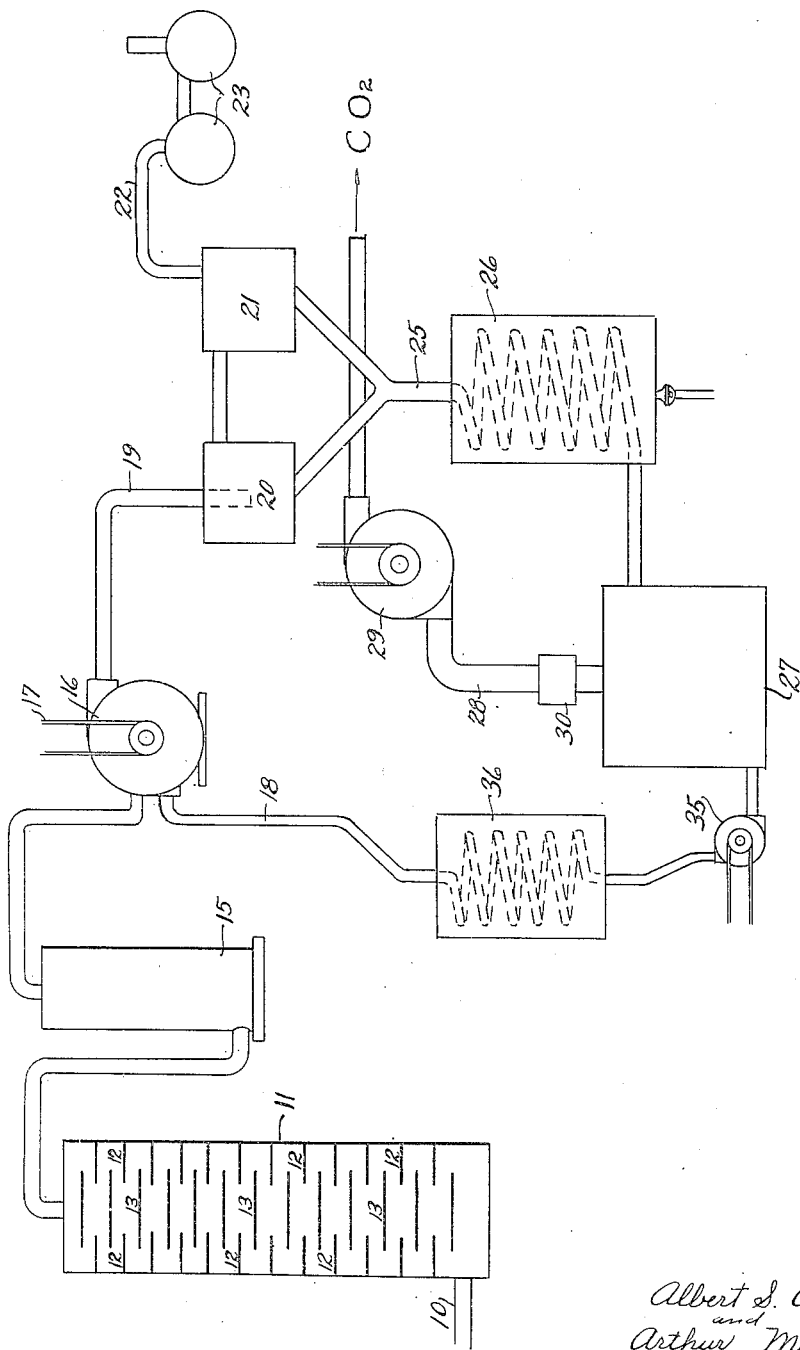

1,934,472

UNITED STATES PATENT OFFICE 1,934,472

METHOD OF SEPARATING CARBON DIOXIDE FROM A GAS MIXTURE

Albert S. Allen, Yonkers, N. Y., and Arthur Michalske, Cleveland, Ohio

Application October 30, 1930. Serial No. 492,208

3 Claims. (Cl. 23—150)

This invention relates to methods and means for separating gases and more particularly to a method and apparatus for separating carbon dioxide from flue gases, although the process may be employed for absorbing almost any acid gas.

In recent years, the uses of carbon dioxide have increased tremendously, and as flue gases ordinarily contain a relatively large percentage of carbon dioxide many attempts have been made to utilize this economical source of the gas. However, the prior processes have been too slow and the apparatus required too expensive for successful commercial operation. Accordingly, a general object of our invention is to provide a rapid and economical process of extracting a gas from a mixture of gases, such as carbon dioxide from flue gases, and a further object is to provide apparatus for efficiently carrying out the process.

Other objects and advantages of our invention will become apparent from the following description of a preferred form thereof, reference being made to the accompanying drawing, which show a diagrammatic lay-out of a plant for removing carbon dioxide from flue gases.

In our process, we may employ any suitable alkaline absorbing medium, and such absorbent is regenerated and used over and over again. The absorption takes place under pressure greater than atmospheric, and the gas is intimately mixed with the absorbing fluid, with the result that nearly all of the carbon dioxide present is rapidly absorbed.

Our process may be briefly described as follows:

The flue gas is first conducted through a scrubbing tower or towers, where cinders and solid impurities and certain objectionable gases are removed. It is then dried and from the drying tower goes to a compressor, where the pressure of the gas is raised to about two atmospheres and at the same time, the gas is intimately mixed with the absorbent, which is in liquid form, and which is preferably a solution of either sodium carbonate ($Na_2CO_3$) or triethanolamine carbonate [$N(C_2H_4OH)_3H]_2CO_3$. The carbon dioxide is quickly absorbed and the saturated fluid and the unabsorbed portions of the flue gas, such as oxygen, nitrogen, carbon monoxide, etc. are conveyed to a drip chamber, where the unabsorbed gases are separated from the absorbent and allowed to pass off into the air. The saturated absorbing fluid is then conveyed to a heater, where it is heated slightly, and it then flows to a boiling chamber, where the carbon dioxide is evolved and the absorbent regenerated in a vacuum of about two inches of mercury. The carbon dioxide is then passed through a drier and a gasometer and thereafter the gas may be further purified and liquefied or compressed into tanks for shipment. The regenerated absorbing fluid is drawn off from the bottom of the boiling chamber and cooled. It may then be supplied to the first compressor, where it is again mixed with the incoming flue gases. It will be seen that the process is continuous and that the absorbent may be used again and again.

Referring now to the drawing, the flue gas is led from any convenient point in the furnace or flue through a conduit 10 to a scrubbing tower 11. The gas enters the tower at the base thereof and flows upwardly through the tower and around the baffle plates 12 and 13. Water is supplied to the top of the tower and allowed to trickle down over the baffle plates, thus thoroughly scrubbing the gas and removing most of the suspended, solid matter.

From the scrubbing tower the gas is conducted to a drying tower 15, where the excess moisture is removed. After leaving the drying tower, the gas passes to a compressor 16, which may be driven by any suitable power, such as the belt 17.

In the compressor, the pressure of the gas is raised to about twenty pounds per square inch, and it is thoroughly mixed with the absorbing liquid, which may be supplied to the compressor through a conduit 18. A type of compressor which is particularly adapted to the present operation is described in the patent to Nash, No. 1,091,529, issued March 31st, 1914; and briefly, comprises a rotary impellor, mounted within an elliptical casing. A liquid is employed to seal the impellor and in our apparatus the absorbent is used for this purpose. Centrifugal force causes the liquid to follow closely the contour of the elliptical casing, thus causing the liquid to move toward and away from the axis of the impellor. The ports are arranged so that this action compresses the gas. The amount of liquid within the casing of the pump remains substantially constant, and thus as much liquid will be discharged along with the gas as is supplied to the pump through the conduit 18. The action of the impellor is such that the gas is very thoroughly and intimately mixed with the liquid under pressure, and during this mixing the carbon dioxide is absorbed.

As stated above, we have found that sodium carbonate and triethanolamine carbonate are satisfactory, as absorbents. If sodium carbonate is employed, the reaction which takes place between carbon dioxide and the absorbent is substantially as follows:

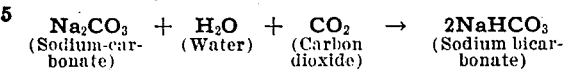
(Sodium car-   (Water)   (Carbon   (Sodium bicar-
bonate)                  dioxide)  bonate)

When triethanolamine is employed, the first reaction between the carbon dioxide and the absorbent converts the triethanolamine into triethanolamine carbonate, which is a relatively stable substance, in accordance with the following equation:

$$2N(C_2H_4OH)_3 + H_2O + CO_2 \rightarrow [N(C_2H_4OH)_3H]_2CO_3$$
(Triethanol-  (Water)(Carbon   (Triethanolamine
amine)                dioxide)   carbonate)

Thereafter, the triethanolamine carbonate is employed as an absorbent and the reaction between it and the carbon dioxide of the flue gas results in the formation of the acid carbonate which is readily decomposed by heat.

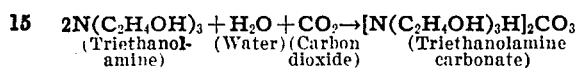
(Triethanolamine  (Water)(Carbon   (Triethanolamine
carbonate)              dioxide)    bicarbonate)

From the compressor the unabsorbed portions of the flue gas, consisting mostly of oxygen, nitrogen and carbon monoxide, together with the absorbent containing the carbon dioxide, are conveyed through the conduit 19 to drip chambers 20 and 21. Here the unabsorbed gases are separated from the absorbent and are allowed to pass through a conduit 22 to an air filter 23, which will recover any of the absorbent which may be carried along with the gases, and then to the atmosphere.

The saturated absorbent flows downwardly from the drip chambers through a Y-shaped conduit 25 and into a heater 26. Here the saturated absorbent is pre-heated to such a degree (about 100° C. if triethanolamine carbonate is employed) that when it reaches the boiling chamber 27, the carbon dioxide will be rapidly given off.

When a sodium carbonate solution is employed as the absorbent, the following reaction will take place:

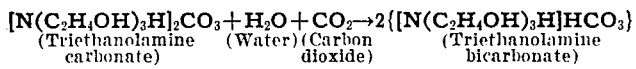
(Sodium bi-   (Sodium car-(Water)(Carbon
carbonate)    bonate)            dioxide)

If triethanolamine carbonate is used, the reaction is as follows, the solution boiling at about 100° C.

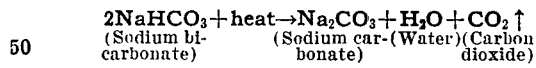
(Triethanolamine        (Triethanolamine   (Water)(Carbon
bicarbonate)            carbonate)                dioxide)

Thus it will be seen that in both cases the solution will be completely regenerated and may be used indefinitely.

We prefer to maintain a vacuum of about two inches of mercury within the boiling chamber to increase the rate of evolution of the carbon dioxide and this may be attained by connecting the outlet conduit 28 with the intake side of a compressor 29. Additional heat may be supplied to the boiling chamber in order to maintain its temperature at about 100° C. From the boiling chamber the carbon dioxide flows through a drier and gasometer 30, and then to the compressor 29, which delivers it ready for further operations.

The regenerated absorbent is continuously removed from the boiling chamber by means of a small pump 35, which is employed to circulate the liquid through the cooling coils 36, where it is cooled to about 20° C., and then to return it to the conduit 18, where it is supplied to the compressor and is again used for absorbing the carbon dioxide in the flue gas.

From the foregoing description, it will be seen that our process employs a continuous regenerative cycle of operations, in which the absorbent may be utilized again and again. Likewise, the absorbent is circulated through a closed circuit, so that the losses will be maintained at a minimum. Furthermore, because of the fact that the absorption of the carbon dioxide takes place under increased pressure, and as the gas is thoroughly mixed with the absorbent, the absorption will take place with great rapidity and a high degree of efficiency.

While we have described only preferred forms of our process and apparatus, it must be understood that various changes may be made without departing from the scope of the invention, as defined by the appended claims.

We claim:

1. A method of separating carbon dioxide from the flue gases comprising circulating a liquid having an affinity for carbon dioxide in a continuous pathway, passing the flue gas into the liquid under pressure while the gas and liquid are moving together in the same general direction, whereby the carbon dioxide is absorbed, separating the remaining parts of the flue gas from the liquid, and thereafter heating the liquid under a reduced pressure and extracting the carbon dioxide therefrom.

2. The method of separating carbon dioxide from flue gases comprising continuously circulating a liquid absorbent, which will form unstable compounds with carbon dioxide, bringing the flue gas at an increased pressure into contact with the liquid while the gas and liquid are moving in the same general direction through a restricted passage, separating the liquid from the unabsorbed parts of the flue gas, applying heat to the liquid and reducing the pressure thereon, whereby the carbon dioxide is removed from the liquid, and recirculating the liquid.

3. A method of separating carbon dioxide from flue gases including the step of compressing the flue gas and simultaneously intimately mixing it with an absorbent fluid moving in the same direction as the gas, whereby the carbon dioxide is absorbed.

ALBERT S. ALLEN.
ARTHUR MICHALSKE.